(12) United States Patent
Han et al.

(10) Patent No.: US 9,120,442 B2
(45) Date of Patent: Sep. 1, 2015

(54) ACOUSTIC AND THERMAL COVER ASSEMBLY

(71) Applicant: GM GLOBAL TECHNOLOGY OPERATIONS LLC, Detroit, MI (US)

(72) Inventors: Ruihua Han, Troy, MI (US); Gary L. Villeneuve, Clarkston, MI (US); Arjinder Singh, Sterling Heights, MI (US); Gary J. Hazelton, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/025,211

(22) Filed: Sep. 12, 2013

(65) Prior Publication Data

US 2014/0076269 A1 Mar. 20, 2014

Related U.S. Application Data

(60) Provisional application No. 61/701,890, filed on Sep. 17, 2012.

(51) Int. Cl.
*B60R 13/08* (2006.01)
*F02B 77/11* (2006.01)
*F02M 25/07* (2006.01)
*F01N 13/14* (2010.01)

(52) U.S. Cl.
CPC ......... *B60R 13/0838* (2013.01); *B60R 13/0876* (2013.01); *F02B 77/11* (2013.01); *F02M 25/0747* (2013.01); *F01N 13/148* (2013.01); *F01N 2260/20* (2013.01); *Y02T 10/121* (2013.01)

(58) Field of Classification Search
CPC ..... F02B 77/11; F02B 77/13; F02M 25/0747; B60R 13/0838; B60R 13/0869; B60R 13/0876
USPC ............... 123/198 E; 181/211–213, 204, 228
See application file for complete search history.

(56) References Cited

U.S. PATENT DOCUMENTS

| | | | |
|---|---|---|---|
| 2006/0073310 A1* | 4/2006 | Winkler | 428/158 |
| 2007/0098954 A1* | 5/2007 | Kozerski | 428/124 |
| 2009/0044930 A1* | 2/2009 | Hazelton et al. | 165/136 |

* cited by examiner

*Primary Examiner* — Lindsay Low
*Assistant Examiner* — Kevin Lathers
(74) *Attorney, Agent, or Firm* — Cantor Colburn LLP

(57) ABSTRACT

An internal combustion engine having an engine body and an acoustic and thermal cover assembly are provided. The engine body includes an exhaust gas recirculation (EGR) pipe extending therefrom and the acoustic and thermal cover assembly is positioned adjacent to the engine body. The acoustic and thermal cover assembly includes a first section and a second section extending along the engine body. The assembly further includes an acoustic and thermal shield extending along the first section, a plastic shell extending along the second section, the acoustic and thermal shield and plastic shell forming a cover, and an insulating layer positioned between the cover and the engine body.

16 Claims, 3 Drawing Sheets

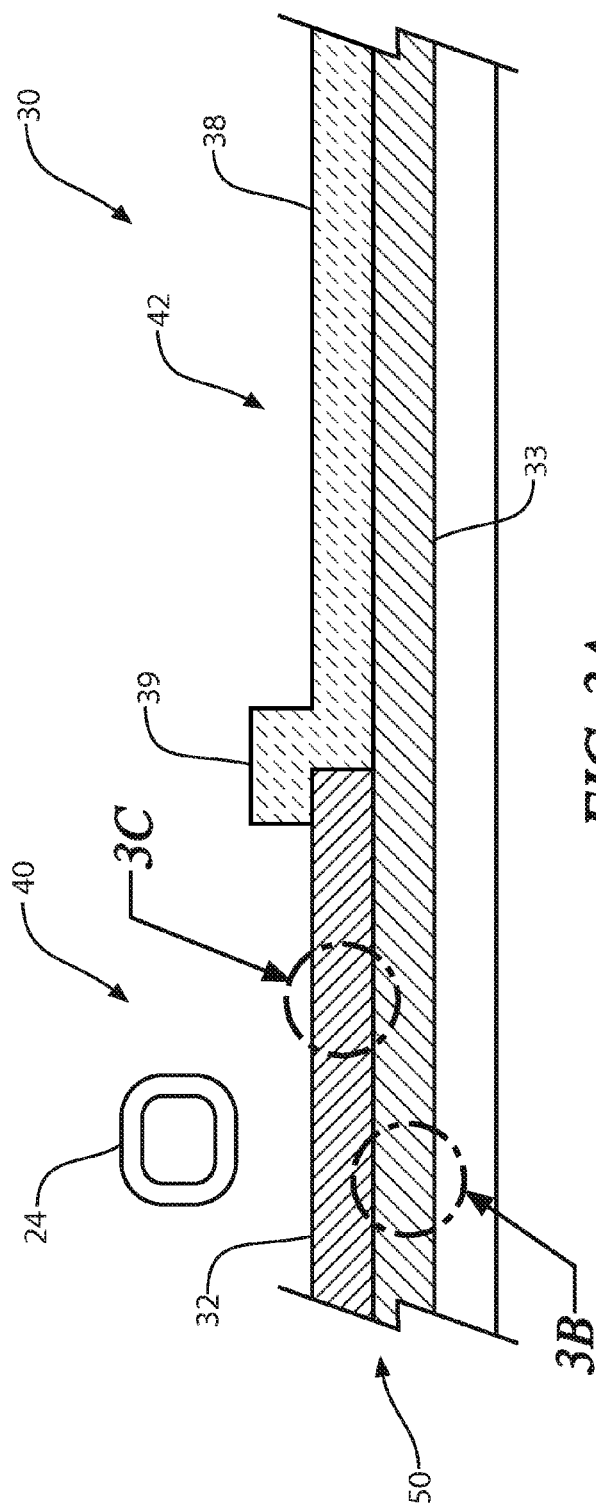
FIG. 3A
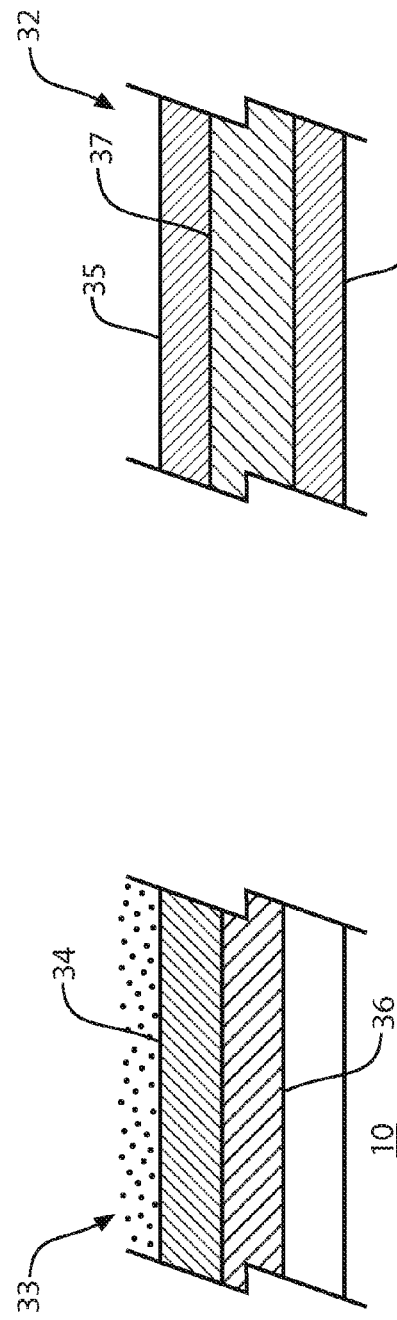
FIG. 3B
FIG. 3C

ACOUSTIC AND THERMAL COVER ASSEMBLY

CROSS-REFERENCE TO RELATED APPLICATIONS

The present application is a nonprovisional application of U.S. Provisional Application Ser. No. 61/701,890 filed on Sep. 17, 2012, the content of which is incorporated herein by reference in its entirety.

FIELD OF THE INVENTION

The subject invention relates to an acoustic and thermal cover assembly, and more particularly, to an acoustic and thermal cover assembly used in connection with an automobile engine.

BACKGROUND

Components of an internal combustion engine of a vehicle generate noise during operation. For example, an engine structure including a rocker cover, fuel rail, fuel lines, and other base engine and attached components radiate noise that is created by combustion, fuel pressure pulsation (vibration), fuel system pump and injector operation, and mechanical noise generated by an engine. The engine noise generated by these components may be an inconvenience or distraction to occupants of a vehicle or other persons nearby.

In addition, an exhaust gas recirculation (EGR) system may be connected to the engine. The EGR system includes a pipe extending from the engine to recirculate a portion of exhaust gas exiting the engine back into cylinders of the engine under certain conditions. The exhaust gas exits the engine at a high temperature. As result, the exhaust gas flowing in the EGR pipe heats the EGR pipe. The heat is then radiated from the EGR pipe and heats surrounding components. Depending on the construction or material of the surrounding components, the heat from the EGR pipe may affect the surrounding components.

Attempts have been made to address the issues above. In one arrangement, a combination of foam and plastic shell is positioned adjacent to the engine in an effort to attenuate sound and protect components from heat radiated from the EGR pipe. In another arrangement, a fiber mat has been positioned adjacent to engine. However, these arrangements do not provide sufficient noise attenuation or sufficiently shield engine components from heat.

Accordingly, it is desirable to provide an acoustic and thermal cover assembly configured to attenuate engine noise to improve passenger comfort and shield engine components against heat to improve service life of those components.

SUMMARY OF THE INVENTION

In one exemplary embodiment of the invention there is provided an internal combustion engine having an engine body having an exhaust gas recirculation (EGR) pipe extending therefrom and an acoustic and thermal cover assembly positioned adjacent to the engine body, the acoustic and thermal cover assembly having a first section and a second section extending along the engine body. The acoustic and thermal cover assembly includes an acoustic and thermal shield extending along the first section, a plastic shell extending along the second section, the acoustic and thermal shield and plastic shell forming a cover, and an insulating layer positioned between cover and the engine body.

In another exemplary embodiment of the invention, there is provided an acoustic and thermal cover assembly configured to attenuate sound and shield an engine from heat. The assembly includes a first section and a second section, an acoustic and thermal shield extending along the first section, a plastic shell extending along the second section, the acoustic and thermal shield and plastic shell forming a cover, and an insulating layer positioned adjacent to the cover.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIGS. 3A-3C are partial cross sections of the engine showing the acoustic and thermal cover assembly in accordance with another embodiment.

DESCRIPTION OF THE EMBODIMENTS

Figure 1:
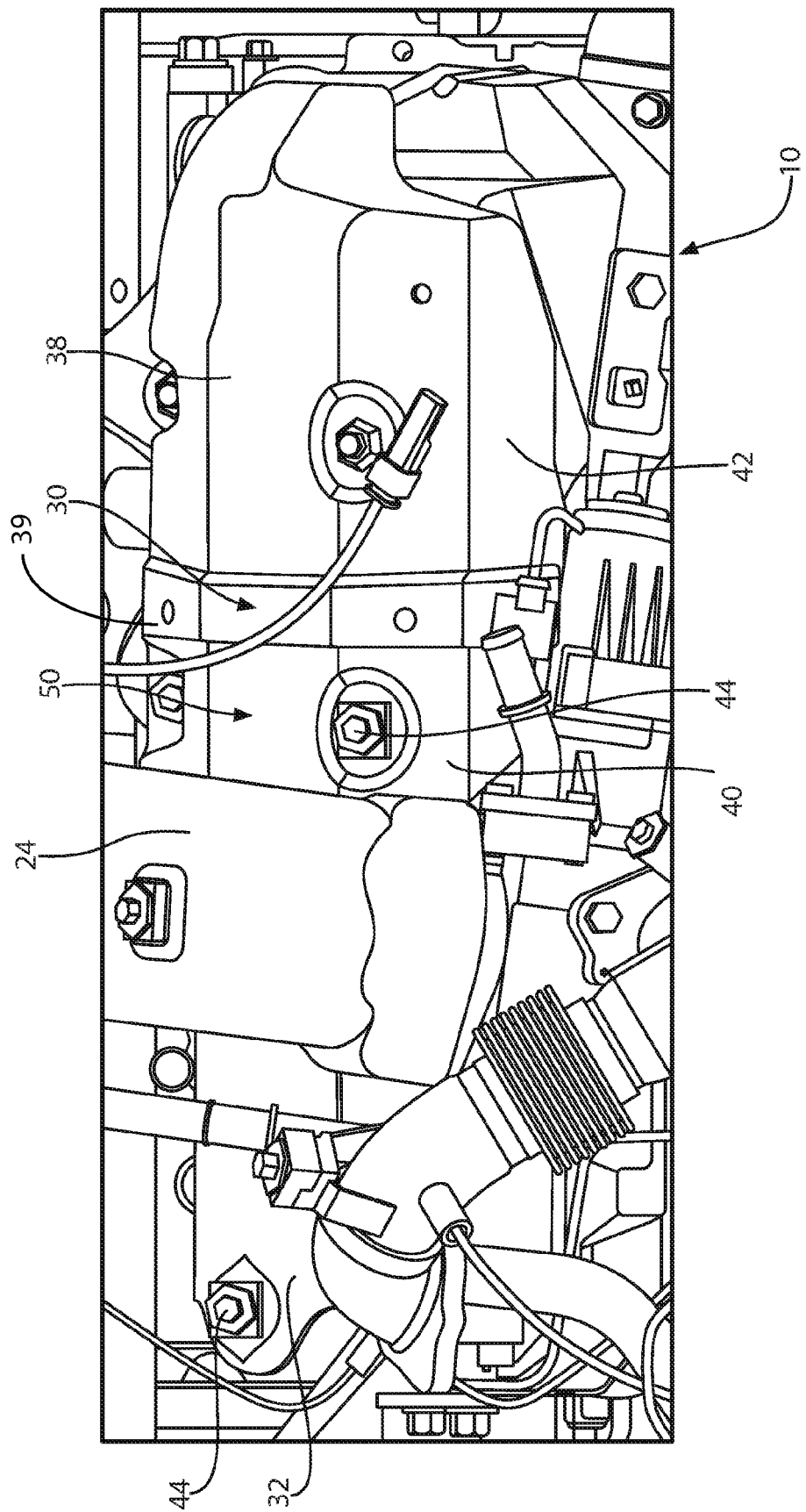
FIG. 1 is a top view of an engine having an acoustic and thermal cover assembly in accordance with an exemplary embodiment of the subject invention.

The following description is merely exemplary in nature and is not intended to limit the present disclosure, its application or uses. It should be understood that throughout the drawings, corresponding reference numerals indicate like or corresponding parts and features.

Figure 2:
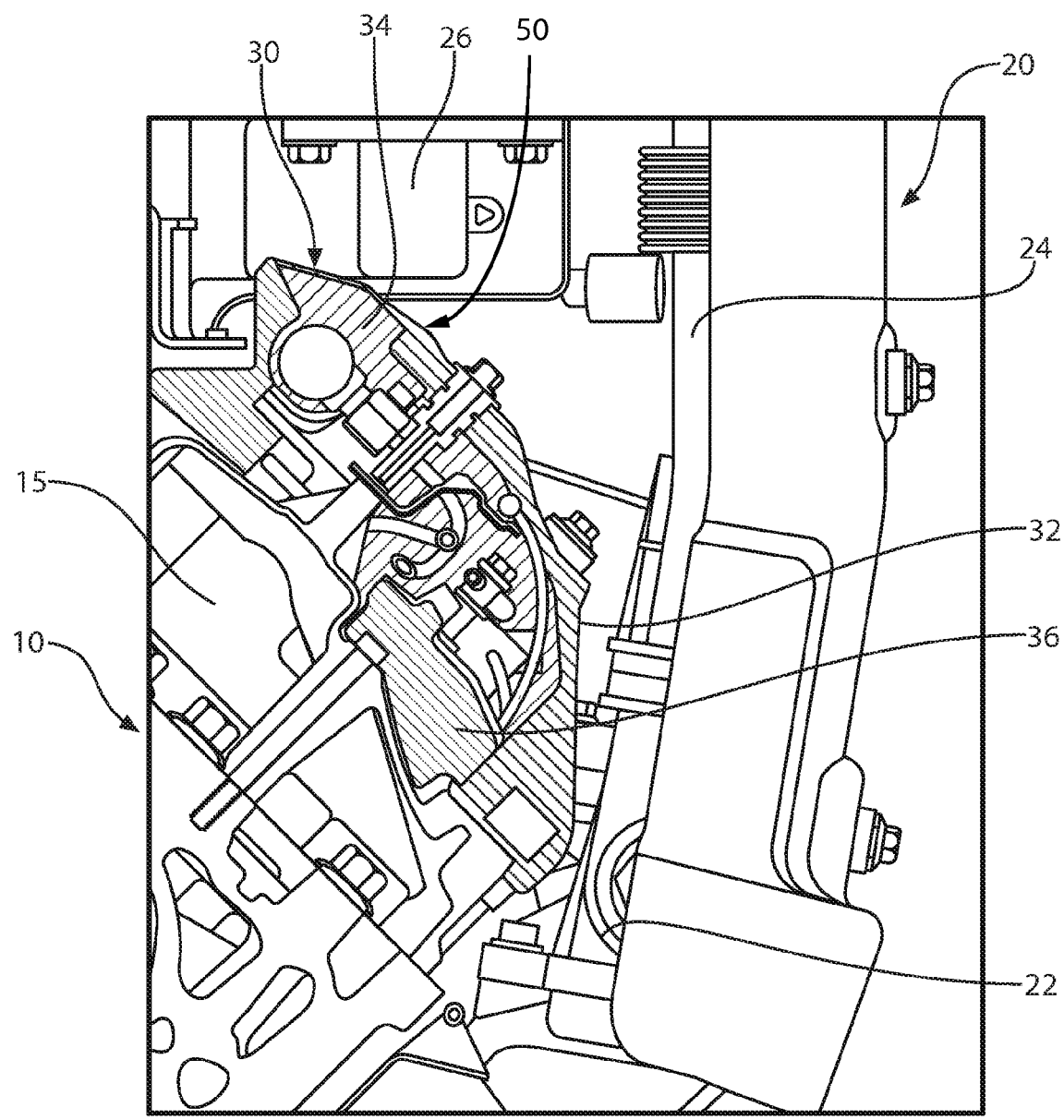
FIG. 2 is a partial cross section of an engine showing the acoustic and thermal cover assembly of FIG. 1.

In accordance with an exemplary embodiment of the invention, and referring to FIGS. 1 and 2, an internal combustion engine 10 includes an engine body 15, an exhaust gas recirculation (EGR) system 20, and an acoustic and thermal cover assembly 30. The internal combustion engine 10 may be, for example, a diesel engine or gasoline engine. In an exemplary embodiment, the internal combustion engine 10 is a diesel engine having a diesel fuel system.

The EGR system 20 includes an EGR valve 22, EGR pipe 24 and EGR bypass valve 26. A portion of exhaust gas flowing from the engine is selectively controlled by the EGR valve 22 to flow into the EGR pipe 24. The EGR pipe 24 is connected to the engine 10 at one end, and extends along a portion of the engine body 15 in spaced relationship therewith.

The exhaust gas flows from the engine at a high temperature. Thus, the portion of the exhaust gas flowing from the engine 10 through the EGR pipe 24 heats the EGR pipe 24 to high temperatures, for example, in some situations, up to 550 C. As a result, the EGR pipe 24 radiates heat toward the engine 10 and various components thereof.

With reference to FIGS. 3A-3C, the acoustic and thermal cover assembly 30 includes an acoustic and thermal shield 32, an insulating layer 33, and a plastic shell 38. In an embodiment, the insulating layer 33 includes a first insulator 34 and a second insulator 36 (FIGS. 2 and 3B). It is understood, however, that the insulating layer 33 may be a single layer formed of a single insulator, or alternatively, may include two or more layers of insulators. The first and second insulators 34, 36 may be formed of the same or a different material. With reference to FIGS. 1 and 3A, the acoustic and thermal cover assembly 30 also includes a first section 40 and second section 42. The acoustic and thermal shield 32 extends along the first section 40 and the plastic shell 38 extends along the second section 42. The acoustic and thermal shield 32 and the plastic shell 38 form a cover 50.

With further reference to FIG. 1, the first section 40 of the acoustic and thermal cover assembly 30 is configured to shield the internal combustion engine 10 and the components thereof from a higher temperature range than the second section 42. In an exemplary embodiment, the acoustic and thermal shield 32 extending along the first section 40 is formed by two outer layers 35 sandwiching an inner layer 37 (FIG. 3C). The two outer layers 35 may be formed of, for example, aluminized steel, stainless steel, aluminum, high temperature silicone or a composite material. The inner layer 37 may be formed of, for example, one or more layers of ceramic fiber, glass fiber, high temperature fiber aggregate, lava rock, an air gap, or a combination of the foregoing. It is understood that the list of materials above is non-exhaustive, and the present invention is not limited thereto. For example, the outer layers 35 of the acoustic and thermal shield 32 may be formed of another suitable heat resistant material while the inner layer 37 may be formed of another suitable heat resistant and acoustic absorbing material. The plastic shell 38 extending along the second section 42 may be formed of a plastic or similar material. The first section 40 offers greater heat shielding or deflecting properties than the second section based on the selection of material.

An outer layer 35 of the acoustic and thermal shield 32 positioned on an engine side of the heat shield (i.e., a side of the acoustic and thermal shield 32 adjacent the engine) may have a plurality of openings (not shown) formed therein. The openings allow noise generated by the engine or attached engine components to travel to the inner layer 37, where the noise may be absorbed by the inner layer 37. In addition, an outer layer 35 of the acoustic and thermal shield 32 opposite the engine (i.e., adjacent the EGR pipe 24) may include a treatment formed thereon to improve operating characteristics, such as a plurality of holes or bumps (not shown).

In an exemplary embodiment, and as shown in FIG. 1, the acoustic and thermal shield 32 and plastic shell 38 are fixed to each other. For example, the acoustic and thermal shield 32 and plastic shell 38 may include overlapping portions 39 for acoustic sealing. A suitable fastener (not shown) may be inserted through the overlapping portions to attach the acoustic and thermal shield 32 to the plastic shell 38.

In an exemplary embodiment, the first section 40 is positioned between the engine body and the EGR pipe 24. That is, the section of the acoustic and thermal cover assembly 30 configured to shield a higher temperature range is positioned between the EGR pipe 24 and the engine body 15. Thus, heat radiating from EGR pipe 24 may be shielded or deflected from the engine body 15. The second section 42 is spaced from the EGR pipe 24 and thus, is subject to a lower temperature range. Accordingly, the second section 42 may be made from materials with reduced heat shielding or deflecting characteristics, such as plastic. By using materials having different heat shielding or deflecting properties depending on proximity to the EGR pipe 24, material costs may be reduced. It is understood that more than one section configured to shield against high temperature and/or more than one section configured for use in a lower temperature region may be provided. For example, a plastic shell or foam section may be positioned on both sides of the first section 40.

Referring to FIG. 2, the first insulator 34 is positioned adjacent to the cover 50, and between the cover 50 and the engine body 15. In an exemplary embodiment, the first insulator 34 abuts against an inner side of the cover 50 (i.e., a side of the cover 50 adjacent the engine body 15). The second insulator 36 is positioned between the first insulator 34 and the engine body 15. In an exemplary embodiment, the second insulator 36 abuts a portion of the engine body 15. It is understood that the second insulator 36 may include portions that extend around the first insulator 34 such that the portions are not arranged between the first insulator 34 and the engine body 15.

In an exemplary embodiment, the first and second insulators 34, 36 may be formed of foam, such as polyurethane (PU) foam or melamine foam. In another embodiment, the first and second insulators 34, 36 may be made from molded fiber glass. It is understood that the list of materials above is non-exhaustive and other suitable materials may be used. In some instances, where the material used for the first and second insulators 34, 36 has sufficient hardness, durability, and/or resistance to heat, the plastic shell 38 may be omitted, such that a side of the insulator(s) facing away from the engine is exposed. That is, the plastic shell 38 may be omitted where the material of the insulating layer provides a sufficient barrier capable of handling the engine environment including mounting requirements.

The first and second insulators 34, 36 are configured to attenuate noise from the engine 10. Noise from the engine 10 may originate from various engine structures such as a rocker cover, fuel rail, fuel lines, and other base engine and attached components which radiate noise created by combustion, fuel pressure pulsation (vibration), fuel system pump and injector operation, along with other mechanical noise generated by the engine.

The acoustic and thermal cover assembly 30 may be fixed to the engine 10 with at least one fastener 44. The fastener 44 may be any suitable fastener such as a bolt or screw, but is not limited thereto. The acoustic and thermal cover assembly 30 is positioned adjacent to the engine 10 such that fastener openings of the acoustic and thermal cover assembly 30 are aligned with fastener openings of the engine 10. The fasteners 44 may then be installed through the respective fastener openings.

The acoustic and thermal cover assembly 30 is used to attenuate noise and to deflect heat. It may be integrated with an insulating layer 33, which may include first and second insulators 34, 36, and a plastic shell to reduce noise originating from a fuel system in the engine 10, and combustion noise radiated from rocker covers as well as engine mechanical noise.

While the acoustic and thermal cover assembly 30 is described above to shield against heat radiated from an EGR pipe 24, it is understood that the acoustic and thermal cover assembly 30 may be configured or positioned to shield the engine 10 against heat from other sources. For example, the acoustic and thermal cover assembly 30 may be configured to shield the engine 10 against heat radiated from a diesel oxidation catalyst (DOC) or other similar device (not shown).

Embodiments described herein provide advantages in reducing the number of heat shields used in conventional configurations to protect engine components from hot surfaces. By integrating components of different materials, advantages are gained in protecting components from the heat while improving the noise performance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An internal combustion engine comprising:
an engine body having an exhaust gas recirculation (EGR) pipe extending therefrom;
an acoustic and thermal cover assembly positioned adjacent to the engine body, the acoustic and thermal cover assembly having a first section and a second section extending from one end of the first section, the first section and second section extending along the engine body, the assembly comprising:
an acoustic and thermal shield extending along the first section adjacent the EGR pipe;
a plastic shell extending along the second section, the acoustic and thermal shield and plastic shell forming a cover, the plastic shell being distal from the EGR pipe; and
an insulating layer positioned between the cover and the engine body, the insulating layer extending across the first section and the second section; and
wherein the acoustic and thermal shield is made from three layers disposed in a laminar arrangement with the insulating layer, the outer layers being made from aluminized steel and the inner layer being made from ceramic fiber.

2. The internal combustion engine of claim 1, wherein the first section of the acoustic and thermal cover assembly is positioned between the EGR pipe and the engine body.

3. The internal combustion engine of claim 1, wherein the insulating layer is made from polyurethane (PU) foam.

4. The internal combustion engine of claim 1, wherein the acoustic and thermal cover assembly is fastened to the engine body.

5. The internal combustion engine of claim 1, wherein the first section of the acoustic and thermal cover assembly is configured to operate at a higher temperature range the second section of the acoustic and thermal cover assembly.

6. The internal combustion engine of claim 1, wherein the insulating layer comprises a first insulating layer and second insulating layer, the first insulating layer having a first portion positioned between the cover and the engine body, the first insulating layer having a second portion engaging one of the outer layers, the second insulating layer being positioned between the first portion and the engine body.

7. An acoustic and thermal cover assembly configured to attenuate sound and shield an engine from heat, the assembly comprising:
a first section and a second section, the second section extending from a first end of the first section;
an acoustic and thermal shield extending along the first section;
a plastic shell extending along the second section, the acoustic and thermal shield and plastic shell forming a cover, the plastic shell having a second end that overlaps the first end; and
an insulating layer positioned adjacent to the cover and extending between the first section and the second section;
the acoustic and thermal cover assembly is configured to be fastened to an engine body;
the second end is coupled to the first end by a fastener extending through the overlapping portion; and
wherein the acoustic and thermal shield includes a first layer and a second layer;
wherein the first section is configured to shield against a higher temperature range than the second section.

8. The acoustic and thermal cover assembly of claim 7 wherein the first layer is formed from aluminized steel and the second layer is formed from a ceramic fiber.

9. The acoustic and thermal cover assembly of claim 8 wherein the acoustic and thermal shield includes a third layer opposite the first layer, the third layer being made from aluminized steel.

10. The acoustic and thermal cover assembly of claim 9, wherein the insulating layer includes a first insulating layer positioned adjacent to the cover and a second insulating layer positioned adjacent to the first insulator.

11. The acoustic and thermal cover assembly of claim 10, wherein the first insulating layer and second insulating layer are made from polyurethane (PU) foam.

12. The acoustic and thermal cover assembly of claim 7 wherein the first section is configured to operate at a higher temperature range than the second section.

13. The acoustic and thermal cover assembly of claim 12 wherein the insulating layer comprises a first insulating layer positioned between the cover and the engine body and a second insulating layer positioned between the first insulating layer and the engine body.

14. An internal combustion engine comprising:
an engine body;
an exhaust gas recirculation (EGR) pipe extending from the engine body, the EGR pipe having at least a first portion that extends across the engine body;
an acoustic and thermal cover assembly positioned adjacent to the engine body, the acoustic and thermal cover assembly having a first section and a second section extending from a first end of the first section, the first section and second section extending along the engine body, the first section being disposed between the first portion and the engine body, the assembly comprising:
an acoustic and thermal shield extending along the first section adjacent the EGR pipe;
a plastic shell extending along the second section, the plastic shell having a second end that at least partially overlaps the first end, the acoustic and thermal shield and plastic shell forming a cover, the plastic shell being spaced apart from the EGR pipe;
an insulating layer positioned between the cover and the engine body, the insulating layer extending across the first section and the second section; and
at least one fastener coupling the acoustic and thermal shield to the plastic shell, the at least one fastener extending through the overlapping portion of the first end and second end.

15. The internal combustion engine of claim 14 wherein:
the thermal and acoustic shield includes a first layer, a second layer and a third layer disposed between the first layer and second layer, the first layer and second layer being formed from a material chosen from a group consisting of aluminized steel, stainless steel, aluminum and high temperature silicone, the third layer being selected from a group consisting of ceramic fiber, glass fiber, high temperature fiber aggregate and lava rock; and
the insulating layer includes a fourth layer and a fifth layer, the fourth layer and fifth layer being selected from a group consisting of polyurethane foam, melamine foam and molded fiber glass.

16. The internal combustion engine of claim 15 wherein the second layer is arranged between the third layer and the engine body, the second layer having a plurality of openings formed therein.

* * * * *